United States Patent [19]

Vicari

[11] Patent Number: 5,048,447
[45] Date of Patent: Sep. 17, 1991

[54] TOURNAMENT STYLE TACKLE BOX AFFIXED TO BOAT

[75] Inventor: Dominic Vicari, Stafford, Va.

[73] Assignee: Dallas Steele, Jr., Stafford, Va. ; a part interest

[21] Appl. No.: 552,490

[22] Filed: Jul. 16, 1990

[51] Int. Cl.⁵ .............................................. A63D 55/00
[52] U.S. Cl. .................................... 114/255; 114/364; 43/57.1; 206/315.11
[58] Field of Search ........................ 114/255, 343, 364; 43/54.1, 57.1; 312/266, DIG. 33; 206/315.11

[56] References Cited

U.S. PATENT DOCUMENTS

| | | |
|---|---|---|
| 1,929,833 | 10/1933 | Van Vuren . |
| 3,251,638 | 5/1966 | Schwartz ............................. 43/57.1 |
| 3,346,313 | 10/1967 | Fee ...................................... 43/57.1 |
| 3,600,840 | 8/1971 | Meyer ................................. 43/57.1 |
| 4,128,170 | 12/1978 | Elliott ................................. 43/57.1 |
| 4,208,826 | 6/1980 | Lindaman ........................... 43/57.1 |
| 4,744,614 | 5/1988 | Gombosi . |
| 4,745,704 | 5/1988 | Schaefer .............................. 43/54.1 |
| 4,791,752 | 12/1988 | Van Kampen ....................... 43/57.1 |

Primary Examiner—Joseph F. Peters, Jr.
Assistant Examiner—Stephen P. Avila
Attorney, Agent, or Firm—Laurence R. Brown

[57] ABSTRACT

Multiple lures are made accessible for display and fast selection by fishermen such as bass tournament fisherman without significant delays of fishing time by means of an onboard resident tackle box secured to a deck of a fishing boat adjacent a fisherman's fishing stand. A large capacity multiple compartment lure display tray with an excess of forty lures is horizontally disposed in a water tight casing having a hinged top panel held open when in use. This meets boating specifications preventing loose objects on deck and protects the tackle during rough water trips. When closed the tackle box may be used as a seat, work table or fishing platform. Under the stationary lure tray are two additional tiers of horizontally accessible trays behind corresponding vertically hinged disappearing doors.

12 Claims, 2 Drawing Sheets 5,048,447

TOURNAMENT STYLE TACKLE BOX AFFIXED TO BOAT

TECHNICAL FIELD

This invention relates to fishing tackle boxes, and more particularly it relates to fishing tackle boxes secured to the deck of a fishing boat.

BACKGROUND ART

Myriads of portable tackle box designs exist, but few are adaptable for use aboard a fishing boat in view of regulations for securing objects to the boat and the conditions encountered on a boat such as water spray, vibration and rocking in the water. Live bait boxes have been mounted in racks secured to the gunwhale of a boat as shown in U.S. Pat. No. 4,744,614, May 17, 1988 to K. D. Gombosi. Portable type tackle boxes are secured to the boat in U.S. Pat. No. 1,929,833, Oct. 10, 1933, G. W. Van Vuren to permit loss if the boat capsizes. Thus a set of horizontally slidable trays are secured in place by a pivotable front shelf that serves as a work table. As such this tackle box must be mounted high, on the forward cowling, for example, and would be dangerous if mounted on a deck where it could encounter a fisherman's shins, particularly in choppy water.

No known prior art tackle box is particularly suitable for the needs of tournament fishermen. In such tournaments, such as a bass tournament where fishermen stand on the deck of a bass boat, it is essential that lures may be viewed, selected and changed quickly. Portable tackle boxes of the prior art are not arranged conveniently for this. Furthermore, most cannot be adapted to boat fishing by being secured to the boat, and if so, they would not be in an accessible position for fast, efficient selection and change of lures. Nor are they capable of handling efficiently for viewing and selection a large number of lures that are necessary for changes in water temperature, depth, color, weeds, desired lure depth and other fishing conditions frequently encountered.

Accordingly it is an objective of this invention to provide an improved on board fishing boat tackle box particularly adapted for tournament fishing.

DISCLOSURE OF THE INVENTION

In a bass fishing boat, for example, the fisherman stands on the deck to fish by casting and retrieving lures. Frequently lures need to be changed as water conditions change from spot to spot. Particularly in fishing tournaments, it is particularly necessary to view, select and change lures efficiently from time to time without wasting time and providing greater chances of catching fish. Thus, the invention provides a tackle box secured on board with specific features for tournament fishing and fishing in general from a bass fishing boat or the like.

Every fisherman has his favorite lures. Tournament fisherman may have accumulated over forty lures that should be kept handy for immediate access. Few tackle boxes allow that. These lures need to be placed in view, for comparison and selection at a convenient display location without significant interruption to fishing, by requiring a trip to another boat location than that where the fisherman stands, or by requiring the fisherman to kneel and open up drawers and trays of conventional tackle boxes. Also the lures need to be quickly replaced with old lures stored, preferably while the fisherman is standing in one place at a fishing site. It is fundamental that no objects interfere with the standing position of the fisherman or have a possibility of getting underfoot where with the rocking of a boat the fisherman could lose balance, or interrupt his fishing rhythm.

Thus, a horizontally disposed tray of a large number of lure compartments, preferably more than forty, is secured to the boat at knee to waist level adjacent a fishing station site, between the fisherman and a gunwhale. A hinged top cover pivots open away from the fisherman and is held open by a suitable detenting mechanism to keep the trays in view for selection when needed. The cover, when closed, doubles as a seat or table. It is water proofed for sealing the lure tray when closed, and lockable to prevent theft of lures.

In a further extension of the invention, two multiple tray tiers of horizontally movable fishing gear trays are aligned below the top lure tray for access through corresponding ones of vertically hinged door panels that swing outwardly, preferably in positions that abut deck structure so that they do not interfere with the standing position of the fisherman.

Other objects, features and advantages of the invention will be found throughout the following detailed description, the claims and accompanying drawings.

BRIEF DESCRIPTION OF THE DRAWINGS

Like reference characters refer to similar features for comparison throughout the several views of the drawings, wherein.

THE PREFERRED EMBODIMENT

Figure 1:
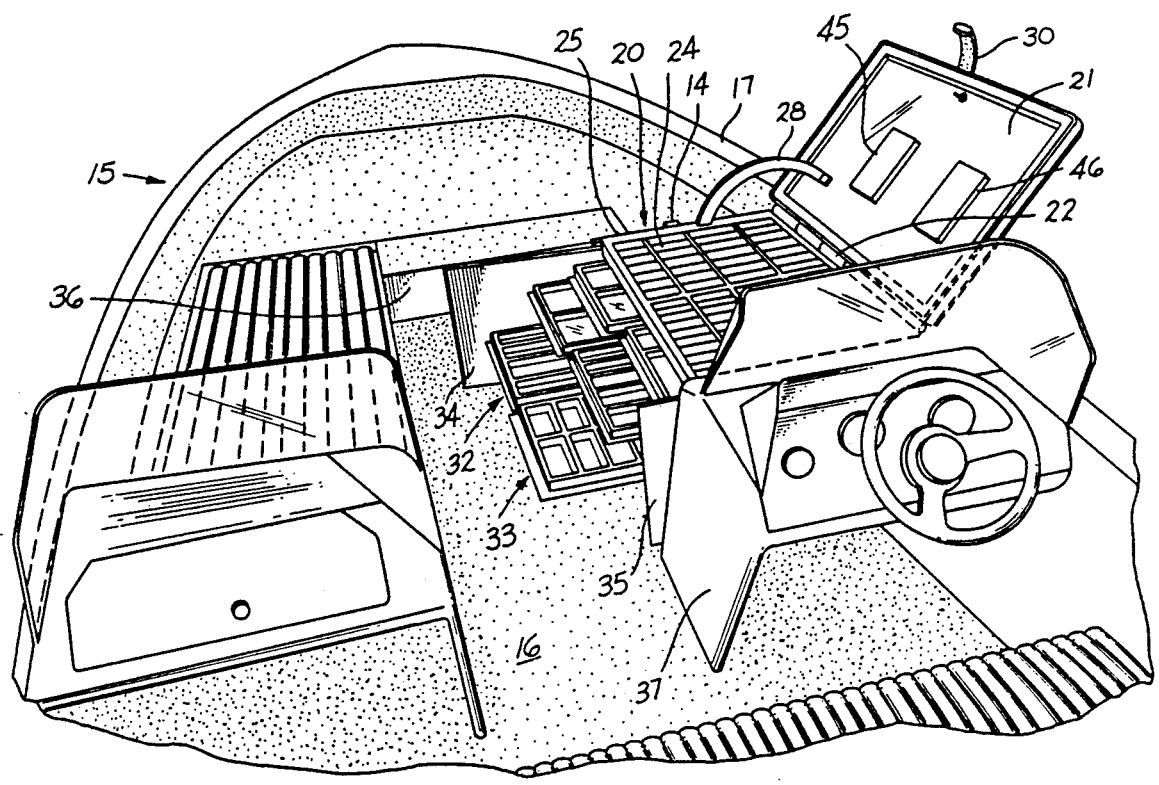
FIG. 1 is a perspective view of the fore portion of a bass fishing boat embodying the tournament fishing tackle box afforded by this invention, open and ready to use.
Figure 2:
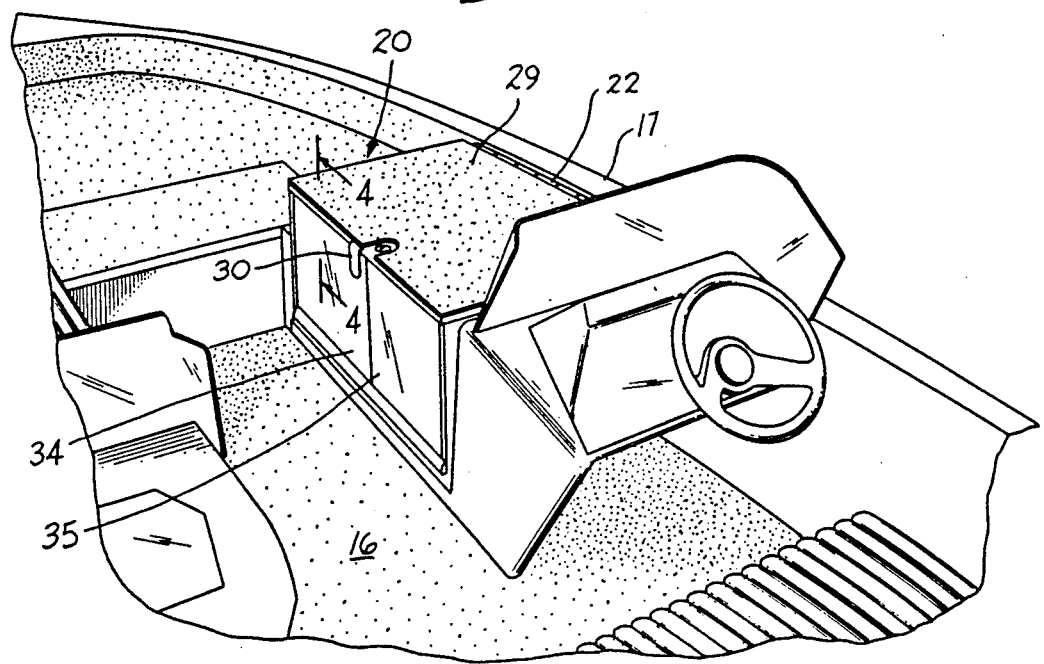
FIG. 2 is a fragmentary view of the boat with the tackle box closed to provide a seat.

As may be seen from FIGS. 1 and 2, the bass fishing boat 15 has a fishing stand site where a fisherman stands on the deck 16 for casting and retrieving lures. Secured to the boat adjacent the gunwhale 17, by means of brackets 14, or the like, is the tournament tackle box 20 afforded by this invention. The tackle box 20 is preferably custom fitted to a fishing boat or made to fit dimensions of different fishing boat brands or models. A top lid 21 is hinged at 22 to swing open (FIG. 1) when the fisherman desires to view, select and change lures 23 located in the four dozen or so lure compartments 24 horizontally disposed in the lure tray 25. The lid is held open by a suitable detent mechanism, such as attached to the bracket 28 in this embodiment, which can be manually overcome when desired to close the lid 21. In closed position it forms a seat or fishing platform, such as shown in FIG. 2 with a cover 29, preferably of marine carpeting. A suitable lock is attached, such as to the flap 30 to prevent unauthorized access to the lure tray.

Additional lure or fishing gear storage is produced by the two tiers of horizontally movable trays 32, 33 disposed under the lure tray 25. Access to each tier is provided by means of vertically hinged doors 34, 35, which swing open from the center. These doors are of the disappearing type, known as pocket doors to slide into side panels of the tackle box adjacent to existing boat panels 36, 37 so that they do not interfere with footroom at the fishing site on deck 16.

Figure 4:
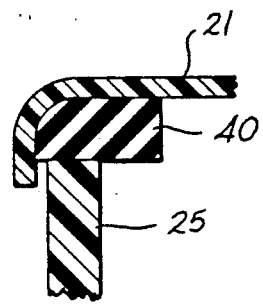
FIG. 4 is a detailed fragmentary view of an edge of the tackle box lid in closed position over the tackle lure tray.

As seen from the fragmentary view along taken along lines 4—4, as shown in FIG. 4, it is seen that the lid is preferably of wood or fiberglass. To keep water, spray, etc. out of the lure tray a suitable rubber or plastic flexible seal 40 is squeezed between the lid and the top of the tray 25, which is preferably of wood or fiberglass. Similar sealing structure may be provided, as well as detenting mechanisms for the outwardly swinging vertically hinged doors 34, 35.

Figure 3:
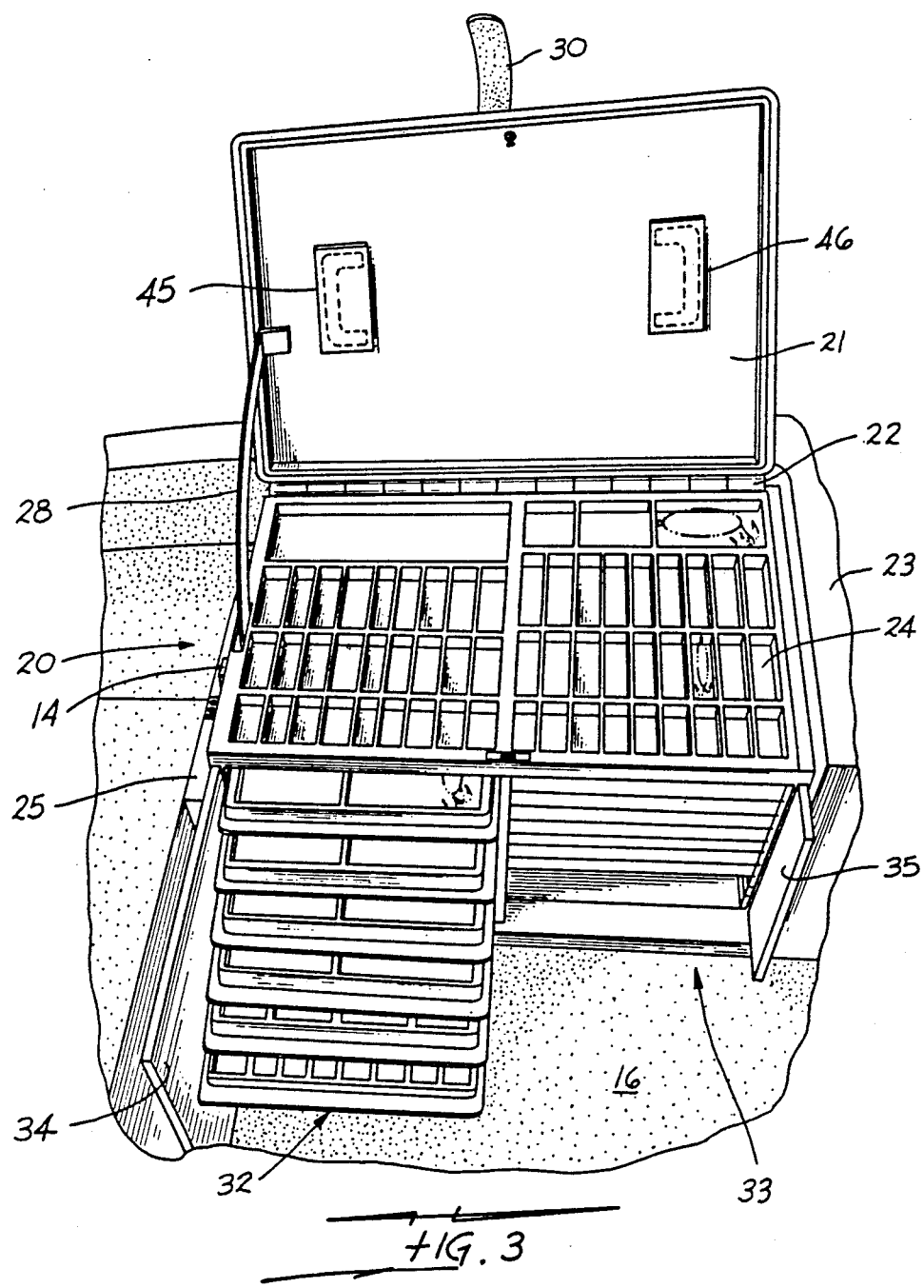
FIG. 3 is a fragmentary view of the open tackle box from the fisherman's deck fishing site point of view.

As best seen from the front view of FIG. 3, thus the fisherman has a comprehensive display of lures and other fishing gear for quick selection and change during a fishing trip or tournament without leaving the fishing stand site. Also it is readily recognized that this installation secured to the deck of the boat meets all regulations regarding loose gear, and prevents any chances of interference with the footing or balance of the fisherman when the top lid 21 is left open for lure selection. The lures are at a handy and efficient inspection level, between the knees and waist, for efficient fast selection and exchange.

The box 20 is preferably wood or fiberglass of sufficient strength to sit on as a seat and to stand on as a fishing platform, appropriately secured in place by means of suitable brackets, screw and or mastic means, (not shown).

All hardware is of the non-corroding marine type generally brass or stainless steel. At each end of the top lid, for example, a pair of disappearing handles 45, 46, flush with the top cover surface, are placed so that the tackle box may be removed and used as a portable tackle box. Suitable mounting brackets (14, FIG. 1) fitted to the steering console and bow upper deck platform with quick release fasteners, preferably padlocked or otherwise secured to avoid theft, permit the tackle box to be more readily removed.

Those novel features describing the nature and spirit of the invention which advance the state of the art are set forth with particularity in the following claims.

I claim:

1. A fishing tackle box securely affixed on at least two opposite sides of four substantially vertical sides to a fishing boat at a deck position between a gunwhale and a fisherman standing site, a hinged planar top surface panel on the tackle box horizontally disposed at a height above the deck for alternative service as a seat and fishing platform for supporting a standing fisherman when not opened for use while fishing, and hinging structure disposed near the gunwhale for opening the panel including means for holding it in open position to expose under the hinged panel a substantially horizontally disposed multiple compartment artificial lure tray accessible to a standing fisherman at a comfortable height when standing on said deck position standing site for rapid selection and change of lures.

2. The tackle box of claim 1 further comprising an assembly of a plurality of horizontally slidable trays for retaining and displaying fishing gear mounted under the lure tray for opening to display stored fishing gear for viewing and selection by said fisherman along with the exposed lure tray.

3. The tackle box of claim 2 further comprising two side by side vertically disposed tiers of said horizontally slidable trays and an accompanying pair of hinged doors pivotable about a vertical axis for use while fishing, each door permitting individual access to one of said tiers of trays.

4. The tackle box of claim 1 further comprising a lure tray for displaying lures in more than forty separated compartments.

5. The tackle box of claim 1 further comprising mounting brackets extending from the tackle box on two of said three sides for securing the tackle box to structure on said fishing boat.

6. The tackle box of claim 1 custom designed and affixed in the fishing boat at a deck site adjacent a gunwhale with one said side affixed to a foremost part of a steering console.

7. The tackle box of claim 1 secured in place on the deck of a bass fishing boat as a deck accessory.

8. The tackle box of claim 1 having carrying handles in the top platform which rest in storage position flush with the top surface panel, and said at least two opposite sides being securely affixed are removably secured to the boat for alternative use of said tackle box as a portable tackle box.

9. A fishing tackle box adapted to be securely affixed to a deck position adjacent a fisherman standing site on a fishing boat, a hinged planar top surface panel on the tackle box horizontally disposed at a height above the deck for alternative service as a seat and fishing platform, when not opened for use while fishing, hinging structure for opening the top panel and holding it open to expose a multiple compartment artificial lure tray accessible to a standing fisherman at a comfortable height for rapid selection and change of lures, a plurality of horizontally slidable trays for retaining and displaying fishing gear mounted under the lure tray for opening to display stored fishing gear for viewing and selection by said fisherman along with the exposed lure tray, two side by side vertically disposed tiers of said horizontally slidable trays and an accompanying pair of hinged doors pivotable about a vertical axis when not opened for use while fishing permitting access to said tier of trays and tackle box end walls with door receiving pockets, wherein said hinged doors are disappearing pocket doors that slide into the pockets in the tackle box end walls.

10. An onboard resident tournament fishing tackle station affixed in place on a fishing boat accessible for ready display and replacement of lures and fishing gear by a fisherman fishing on the boat, comprising in combination, a multiple compartment horizontally disposed lure tray, and a substantially knee high top surface panel strong enough to use both as a seat and a standing site fishing platform and hinged as a lid for exposing at a viewing and selection site said lure tray at a position alongside a fishing station on the deck of the boat for ready access by a fisherman standing on the deck, two tiers of horizontally movable fishing gear storage trays disposed under the lure tray, and a pair of vertically hinged door panels positioned below the top surface panel openable from substantially a center position of the lure tray for access to individual tiers of said horizontally slidable trays disposed beneath the surface panel, and wherein said lure tray is incorporated into a tackle box affixed to the boat, said tackle box has two end panels each having a door receiving pocket therein, and said door panels slide into the end panels.

11. The station of claim 10 wherein said tackle box is affixed in the boar by means of removable fasteners, and constitutes a portable tackle box.

12. The station of claim 10 wherein said tackle box lid comprises handle means storable in the top surface panel to provide a flat topped surface.

* * * * *